Feb. 17, 1948.    E. T. BESSLER ET AL    2,436,088
FLASHLIGHT FOR BOXES
Filed Dec. 26, 1945

INVENTORS
EDWARD T. BESSLER
JAMES A. ORCHOLL
BY

ATTORNEYS

Patented Feb. 17, 1948

2,436,088

UNITED STATES PATENT OFFICE 2,436,088

FLASHLIGHT FOR BOXES

Edward T. Bessler and James A. Orcholl, Milwaukee, Wis.

Application December 26, 1945, Serial No. 637,182

1 Claim. (Cl. 240—6.4)

Our invention has for its object to provide a simple and effective detachable encased flash light for fishing tackle boxes, tool chests, or like containers, wherein the same may be illuminated for inspection or removal of articles, when the container is opened.

The specific object of our invention is to provide a flat faced flash light with a vacuum cup fitted into a central recess of the casing wall, wherein the balanced faces of the casing engage a surface to which the flash light is fitted, whereby the same is cohesively secured, in conjunction with the corresponding friction faces, to insure anchorage.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
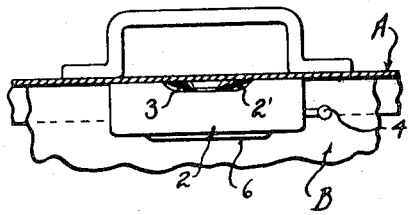
Fig. 1 represents a side elevation partially in section of a container having attached thereto an encased flash light, embodying the features of our invention.
Figure 2:
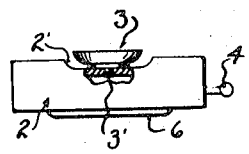
Fig. 2 is a similar view of the flash light, detached from the container, showing the vacuum cup extended and fitted in a central recess of one wall of the casing.
Figure 3:
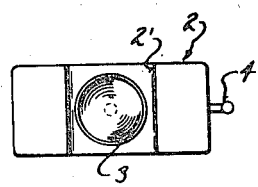
Fig. 3 is a plan view of the same.
Figure 4:
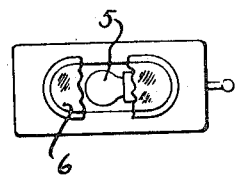
Fig. 4 is a bottom plan view of said flash light unit.

Referring by characters to the drawings, A indicates a fragmentary portion of a removable top of the case or box, and B the box portion thereof. Fitted to the smooth inner wall of the top or cover is a flash light casing 2, having a recess 2' centrally positioned therein for the reception of a yieldable vacuum cup 3, of any standard type, the cup being secured in the casing wall by a threaded shank 3'.

One end of the casing is provided with a button 4 for turning on and off a battery controlled light bulb 5, which bulb is exposed, through the glass covered opening 6, in the bottom wall of the casing.

In order to attach the flash light, all that is necessary is to firmly press the same against the under face of the cover A, whereby the vacuum cup will be compressed upon the same plane as the friction faces upon either end of the recess 2'. Thus when so affixed, the flash light will be firmly and cohesively secured and the friction walls, upon either side of the central recess, will serve to further firmly anchor the flash light, whereby it will be held against twisting.

Obviously, when the chest or box is opened, the light is turned on by the button 4, whereby the entire chest or box is illuminated to more readily inspect the box contents for the purpose of removing any particular instrument or article therein.

It will also be noted that the flash light may be detached from the box for ordinary flash light purposes.

Figure 5:
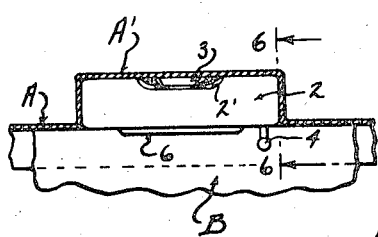
Fig. 5 is a sectional side elevation of a container having an offset cavity in its hinged top fitted with a flash light, embodying the features of our invention, the section being indicated by line 5—5 of Fig. 6.
Figure 6:
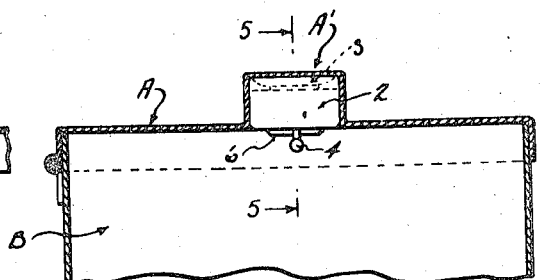
Fig. 6 is a cross section of the same, the section being indicated by line 6—6 of Fig. 5.
Figure 6:

Referring to Figures 5 and 6 of the drawings, a hinged cover A is illustrated in connection with the box B, and said hinged cover, in this exemplification of our invention, is provided with an offset recess or cavity A', which cavity is of the same proximate dimensions as the encased flash light, the same being snugly fitted therein.

From the foregoing description it will be noted that the rectangular pocket in the box top has all of its walls unbroken. The flash light casing is also rectangular in shape, of the proper dimension to tightly fit within the pocket, and front wall is flushed with the top.

The rear flat casing wall is transversely recessed, and has mounted therein the vacuum cup, which cup projects, normally, slightly above the rear wall of the casing. Hence, when the flash light casing is pressed into position its rear wall will contact with the corresponding rear wall of the pocket, and in so doing it will exert pressure upon the cup to cause the same to recede slightly. Thus a compact structure is obtained which will not tend to rock in any direction, and a vent is formed to facilitate insertion of the flash light.

In this exemplification of our invention, the offset cavity removes the flash light from the box area, whereby it is protected and, at the same time, it will increase the capacity of the box or chest, due to the fact that its bottom flash light wall is approximately flush with the inner surface of the top.

We claim:

A box top having an offset flat walled rectangular pocket, a flash light rectangular casing of the same area as the pocket, having a flat rear wall interrupted by a transversely disposed recess forming a vent channel, and a vacuum cup mounted in the casing recess normally projecting above the same, whereby the flat rear wall of the casing engages the corresponding wall of the pocket, and due to said engagement the vacuum cup is compressed.

EDWARD T. BESSLER.
JAMES A. ORCHOLL.

REFERENCES CITED

The following references are of record in the file of this patent:

UNITED STATES PATENTS

| Number | Name | Date |
|---|---|---|
| 2,290,419 | Dunn | July 21, 1942 |
| 1,739,316 | Koban et al. | Dec. 10, 1929 |
| 1,980,351 | Osterman | Nov. 13, 1934 |
| 2,036,088 | Darling | Mar. 31, 1936 |
| 1,183,870 | Greist et al. | May 23, 1916 |
| 2,350,413 | Ordman | June 6, 1944 |

FOREIGN PATENTS

| Number | Country | Date |
|---|---|---|
| 394,744 | Great Britain | July 6, 1933 |